United States Patent
Anderson et al.

(10) Patent No.: US 8,782,138 B2
(45) Date of Patent: Jul. 15, 2014

(54) PREDICTIVE DATA OBJECTS

(76) Inventors: Marko Anderson, Boston, MA (US);
Jarno Koponen, Helsinki (FI)

( * ) Notice: Subject to any disclaimer, the term of this patent is extended or adjusted under 35 U.S.C. 154(b) by 240 days.

(21) Appl. No.: 13/102,254

(22) Filed: May 6, 2011

(65) Prior Publication Data

US 2011/0276632 A1 Nov. 10, 2011

Related U.S. Application Data

(60) Provisional application No. 61/332,890, filed on May 10, 2010.

(51) Int. Cl.
*G06F 15/16* (2006.01)

(52) U.S. Cl.
USPC ............................ 709/205; 709/225; 709/226

(58) Field of Classification Search
CPC ............ G06F 17/30867; H04L 67/306; H04L 12/588; H04L 51/32
USPC .......................................... 709/205, 225, 226
See application file for complete search history.

(56) References Cited

U.S. PATENT DOCUMENTS

| | | | |
|---|---|---|---|
| 7,590,616 B2 | 9/2009 | Guan et al. | |
| 2008/0167016 A1* | 7/2008 | Swanburg et al. | 455/414.1 |
| 2009/0163183 A1* | 6/2009 | O'Donoghue et al. | 455/414.1 |
| 2010/0131455 A1* | 5/2010 | Logan et al. | 707/602 |
| 2010/0205541 A1* | 8/2010 | Rapaport et al. | 715/753 |
| 2011/0264649 A1* | 10/2011 | Hsiao et al. | 707/722 |

* cited by examiner

*Primary Examiner* — Nicholas Taylor
(74) *Attorney, Agent, or Firm* — Ziegler IP Law Group, LLC

(57) ABSTRACT

Profile information for a user is generated and based on the profile information predictive data objects associated with a particular user are generated. Predictive data objects for the user are transmitted and at least one data object from the generated predictive data objects is selected. An option for the user to discover an additional data object from an internal or external network related to the selected data object is provided and information on the discovered data object is stored. An option for the user to share the selected data object to other users within the internal or external network is provided and information on the selected data object is stored. The profile information comprises at least one of the following dynamic filters: personal filter, social filter or contextual filter.

22 Claims, 10 Drawing Sheets

PREDICTIVE DATA OBJECTS

TECHNICAL FIELD

The present disclosure generally relates to predictive data objects. The present disclosure relates more particularly, though not exclusively, to transmitting and presenting predictive data objects for a user based on contextual profile information.

BACKGROUND ART

The ever-increasing amount of digital information is a rich potential resource for people and entities to utilize for their personal and collective benefit. As the amount of potentially available digital information increases, accessing the most beneficial and relevant content and data in a timely manner becomes more difficult.

Current tools, system, interfaces and methods provide only limited capabilities for users to easily access the most beneficial and relevant content and data in a timely manner (for example what they want, where they want, when they want, how they want, why they want, who they want).

Currently popular existing models for discovering new content and data are through searching the internet and through social techniques, for example. Search is primarily an algorithmic approach based on understanding the popularity and dynamics between links and the content and data contained within the links. Social media is a "people-powered" approach where users connect to particular other users and/or entities in order to subscribe or follow relevant content and data from them. Users explicitly receive content and data that is 'pushed' to them by their contacts and connections as appropriate. Both approaches recognize the benefits of the other and increasingly incorporate the respective methodologies. The aspects of the disclosed embodiments address drawbacks of existing solutions and technologies, to provide new, enhanced solutions and techniques and/or to provide new technical alternatives.

SUMMARY

According to a first aspect of the disclosed embodiments there is provided a method comprising:
 generating profile information for a user;
 generating predictive data objects associated with a particular user based on the profile information;
 transmitting predictive data objects for the user;
 selecting at least one data object from the generated predictive data objects;
 providing an option for the user to discover an additional data object from an internal or external network related to the selected data object and storing information on the discovered data object;
 providing an option for the user to share the selected data object to other users within the internal or external network and storing information on the shared data object;
 wherein the profile information comprises at least one of the following dynamic filters: personal filter, social filter or contextual filter.

In certain example embodiments of the disclosure, there is provided a method further comprising:
 generating predictive data objects associated with a particular user based on user input of at least one of the following: a text, a picture, a voice, a video, an audio, a gesture, and a movement.

In certain example embodiments of the disclosure, there is provided a method further comprising:
 providing an option for the user to select an alternative view of the selected data objects from the internal or the external network, and
 storing information on the alternative view data objects.

In certain example embodiments of the disclosure, there is provided a method further comprising:
 providing an option for the user to rate the selected data objects, and
 storing information on the selected data objects.

In certain example embodiments of the disclosure, the personal filter comprises data or data feeds imported by the user, feedback loop of user actions within the internal and/or external systems or automated crawling of online and/or otherwise available user data. The crawling of online and/or otherwise available user data may be based on names, user names, other methods of identification and/or a variety of other attributes and/or combinations of attributes.

In certain example embodiments of the disclosure, the social filter comprises data derived from other users within a user's imported data or data feeds or data derived by recognizing users with similar or related profile attributes within the internal and/or external systems. The profile attribute may comprise user interests, languages information, nationality information, favorites, groups, networks, shared contacts, mobile contacts information, social graph information and/or a variety of other attributes and/or combinations of attributes.

In certain example embodiments of the present disclosure, the contextual filter comprises spatial information and/or temporal information, wherein the spatial information may be derived from an internet protocol (IP) address, mobile geolocation information, proximity to known places or proximity to known users and/or a variety of other attributes and/or combinations of attributes from internal and/or external systems. The temporal information may be derived from local time information, time zone, and/or a variety of other attributes and/or combination of attributes from internal and/or external systems. Other relevant information may be derived from information from internal and/or external systems deemed relevant to building a more accurate understanding of user context.

In certain example embodiments of the present disclosure, the method comprises representing the data objects by an image, in audio, in a combination of audio and visual form or in textual form.

In certain example embodiments of the present disclosure, at least one of the data objects comprises content.

In certain example embodiments of the present disclosure, the external network comprises at least one service index belonging to the group of: Youtube™, Google™, Twitter™, Flickr™, Wikipedia™, Facebook™, Tumblr™, LinkedIn™, MySpace™ and Blogger™.

According to a second aspect of the disclosed embodiments there is provided an apparatus comprising:
 a communication unit configured to receive predictive data objects associated with
 a particular user based on profile information from a service system;
 a user interface controller configured to present the predictive data objects for the user, and to detect the selection of at least one data object from the presented data objects by the user;
 a processor;
 a memory including computer program code;
 the memory and the computer program code configured to, with the processor, cause the apparatus to:

provide an option for the user to discover an additional data object from an internal or external network related to the selected data object;

provide an option for the user to share the selected data object to other users within the internal or external network; and transmit the user's selection to the service system, wherein the profile information comprises at least one of the following dynamic filters: personal filter, social filter or contextual filter.

In certain example embodiments of the present disclosure, the memory and the computer program code are configured to, with the processor, cause the apparatus further to:

generate further predictive data objects associated with a particular user based on user input of at least one of the following: a text, a picture, a voice, a video, an audio, a gesture, and a movement.

In certain example embodiments of the present disclosure, the memory and the computer program code are configured to, with the processor, cause the apparatus further to:

provide an option for the user to select an alternative view of the selected data objects from the internal or the external network, and store information on the alternative view data objects.

In certain example embodiments of the present disclosure, the memory and the computer program code are configured to, with the processor, cause the apparatus further to:

provide an option for the user to rate the selected data objects, and store information on the selected data objects.

In certain example embodiments of the present disclosure, the personal filter comprises feeds imported by the user, feedback loop of user actions or automated crawling of online and open user data, wherein the crawling of online and open user data is based on attributes, user names or other methods of identification.

In certain example embodiments of the present disclosure, the social filter comprising data explicitly derived from other users within a user's imported feeds or data implicitly derived by recognizing users with similar profile attributes, wherein the profile attribute comprises user interests, languages information or nationality information.

In certain example embodiments of the present disclosure the contextual filter comprises spatial information or temporal information, wherein the spatial information is derived from an internet protocol (IP) address, mobile geolocation information, proximity to known places or proximity to known users. In certain example embodiments of the present disclosure, the apparatus comprises the memory and the computer program code configured to, with the processor, cause the apparatus to further represent the data objects by an image or in textual form.

In certain example embodiments of the present disclosure, the external network comprises at least one service index belonging to the group of: Youtube™, Google™, Twitter™, Flickr™, Wikipedia™, Facebook™, Tumblr™ and Blogger™.

The apparatus may be a computer. The apparatus may be a network server. The apparatus may be a service system. The memory may comprise one or more of the following: a system storage, an index database, a cached database or a predictive module. The processor may be a service engine, a crawler, a request processor or a response formatter.

According to a third aspect of the disclosed embodiments there is provided an apparatus comprising:

a processor;

a memory including computer program code;

the memory and the computer program code configured to, with the processor, cause the apparatus to generate profile information for a user;

generate predictive data objects associated with a particular user based on profile information;

transmit predictive data objects for the user using an external interface;

receive a selection done by the user of at least one data object from the transmitted predictive data objects;

provide an option for the user to discover an additional data object from an internal or external network related to the selected data object and storing information on the discovered data object;

provide an option for the user to share the selected data object to other users within the internal or external network and storing information on the shared data object;

wherein the profile information comprises at least one of the following dynamic filters: personal filter, social filter or contextual filter.

In certain example embodiments of the present disclosure, the personal filter comprises feeds imported by the user, feedback loop of user actions or automated crawling of online and open user data, wherein the crawling of online and open user data is based on attributes, user names or other methods of identification.

In certain example embodiments of the present disclosure, the social filter comprises data explicitly derived from other users within a users imported feeds or data implicitly derived by recognizing users with similar profile attributes, wherein the profile attribute comprises user interests, languages information or nationality information.

In certain example embodiments of the present disclosure, the contextual filter comprises spatial information or temporal information, wherein the spatial information is derived from an internet protocol (IP) address, mobile geolocation information, proximity to known places or proximity to known users.

In certain example embodiments of the present disclosure, the apparatus comprises the memory and the computer program code configured to, with the processor, cause the apparatus to further represent the data objects by an image or in textual form.

In certain example embodiments of the present disclosure, the external network comprises at least one service index belonging to the group of: Youtube™, Google™, Twitter™, Flickr™, Wikipedia™, Facebook™, Tumblr™ and Blogger™.

The apparatus may be an electronic device. The apparatus may be a battery-operated device. The apparatus may be a mobile handheld electronic device. The apparatus may be a mobile communication device, such as a cellular mobile station, mobile phone, or similar.

According to a fourth aspect of the disclosed embodiments there is provided a computer program comprising computer executable program code which, when executed by at least one processor of an apparatus, causes the apparatus to perform:

generating profile information for a user;

generating predictive data objects associated with a particular user based on the profile information;

transmitting predictive data objects for the user;

selecting at least one data object from the presented predictive data objects;

providing an option for the user to discover an additional data object from an internal or external network related to the selected data object and storing information on the discovered data object; and providing an option for the user to share the selected data object to other users within the internal or external network and storing information on the shared data object;

wherein the profile information comprises at least one of the following dynamic filters: personal filter, social filter or contextual filter.

According to a fifth aspect of the disclosed embodiments there is provided a memory medium or computer readable medium carrying the computer program of the fourth example aspect.

In certain example embodiments of the present disclosure, a method for presenting predictive data objects based on contextual profile information is described. The method may include generating predictive data objects associated with a particular user, providing the ability to select individual and/or multiple data objects, and providing the user the ability to discover additional data object(s) related to selected data object(s) within the system and/or to external systems. Furthermore, the method may include providing the ability to store/save selected or non-selected data object(s) within the system and/or to external systems and providing the ability to export/share the selected and/or the non-selected data object(s) within the system and/or to external systems.

Data objects may include any type of instance or combination of instances that can be stored in a database. For example, the data objects may refer to time, people, place, location, addresses, events, media, pictures, videos, links, words and text.

There are different possibilities to determine the context of a user profile. For example, inputs from external systems, which may be automatically imported by the system, or information that may be imported manually by the user themselves.

Typical user flow may involve the following phases:
1) User receives predictive data objects
2) User selects (for example, filters/manipulates/collects/aggregates) one or more predictive data objects
3) User takes action (for example, discovers, shares or stores) on the selected objects In an embodiment of the present disclosure, a networked computer system that dynamically provides predictive data objects to a user through a user interface is described. Such system enables users to select individual or multiple data objects and allows users to discover additional data objects related to selected data object(s) within the system and/or to external systems. The system also allows the user to store/save selected and/or non-selected data objects within the system and/or to external systems and allows a user to export/share selected or non-selected data object(s) within the system and/or to external systems.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present disclosure have been illustrated in the foregoing. The above embodiments are used merely to explain selected aspects or steps that may be utilized in implementations of the aspects of the disclosed embodiments. Some embodiments may be presented only with reference to certain aspects of the present disclosure. It should be appreciated that corresponding embodiments may apply to other aspects as well.

BRIEF DESCRIPTION OF THE DRAWINGS

The aspects of the disclosed embodiments will be described, by way of example only, with reference to the accompanying drawings, in which.

DETAILED DESCRIPTION

In the following description, like numbers denote like elements. The systems and techniques described here relate to presenting predictive data objects based on contextual profile information.

Figure 1:
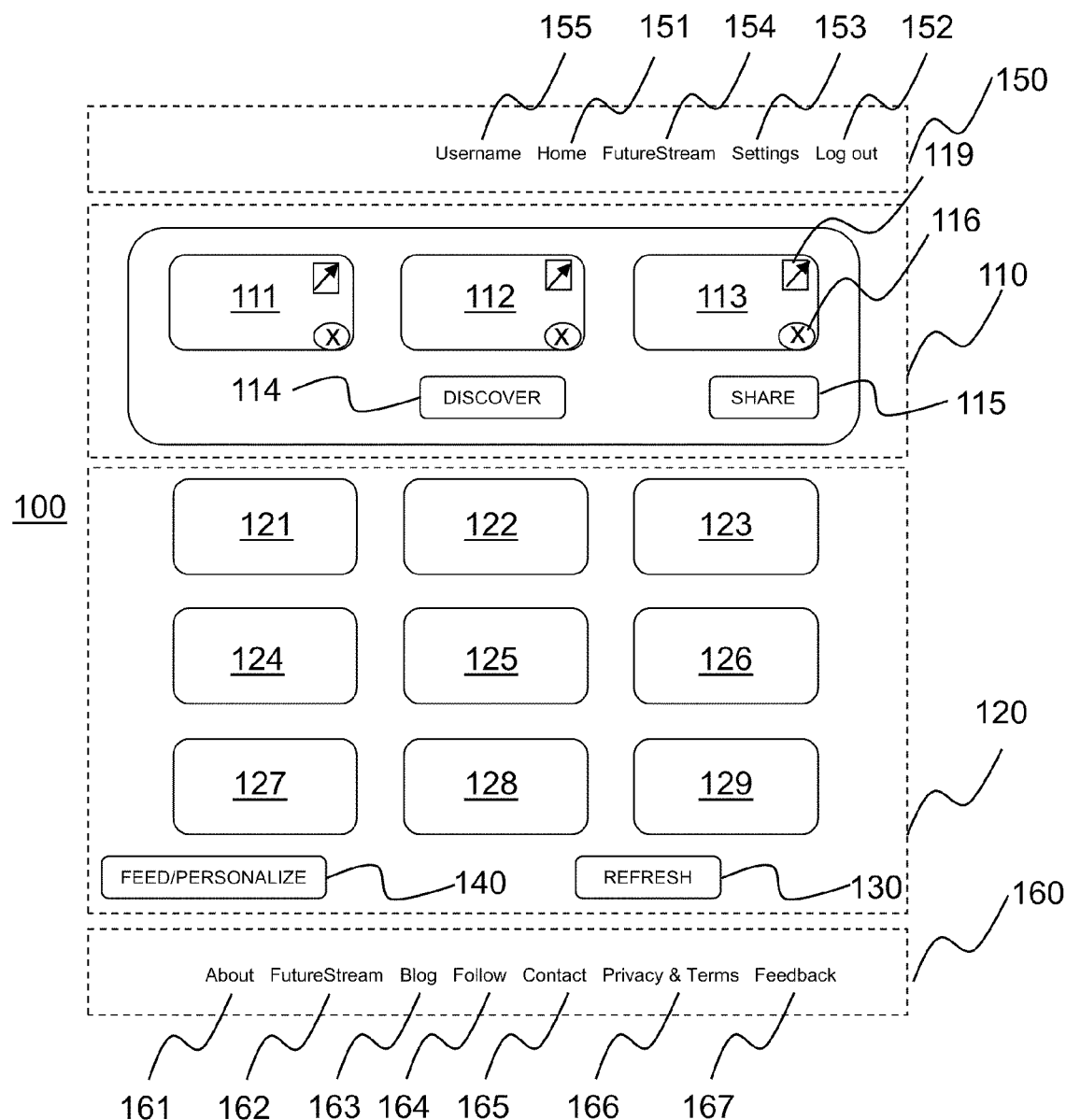
FIG. 1 shows a schematic picture of a display view for the home page viewed by using a method providing predictive data objects according to an example embodiment of the present disclosure.

In an example embodiment of the present disclosure, the basic steps carried out by the user may include:
i. receiving relevant/predictive data objects
ii. further filtering the signal from the noise by selecting one or more predictive data objects
iii. discovering and/or sharing and/or storing relevant new data objects The system and apparatus according to an example embodiment of the present disclosure may provide following functionalities:

i. providing predictive data objects
ii. capturing user actions and updates to contextual profile information
iii. matching relevant new predictive data objects to users FIG. 1 shows a schematic picture of a display view for the home page 100 viewed by using a method providing predictive data objects according to an example embodiment of the present disclosure.

In an example embodiment of the present disclosure, the display view for the home page 100 viewed by using the method providing predictive data objects has two key areas: a discovery area 110 and a matrix area 120. The discovery area 110 may contain data objects 111, 112, 113, a "discover" button 114 and a "share" button 115. The matrix area 120 may contain a matrix of future data objects 121-129 and a "refresh" button 130.

In an example embodiment of the present disclosure, the key elements on the page are the data objects 111-113, 121-129. The number of the data objects presented may vary depending on the system status and user settings. The data objects may be represented by a wide variety of content types, for example image, link, video, music, audio or text. The data objects may be based on keywords parsed from relevant user data, imported feeds, profile information, feedback loop, search related keyword, querying, content and text-matching systems, and/or from a variety of internal and/or external systems and data sources. Thus, the data objects may be expressed in a textual form. For example, pictures and other content types may have underlying keywords for this purpose. This is useful when inserting discovery queries and sharing into to external systems. The aspect ratio of the images, as well as the textual seed boxes, may be decided based on the aspect ratio of the fetched images or the efficiency. Efficiency may depend on the image processing on server side of the system. The data object 111-113, 121-129 may be represented by a webpage, other rendered format of internet content, image, audio, text, or some combination of all of the above. The data object 111-113, 121-129 may also be based on user input of at least one of the following: a text, a picture, a voice, a video, an audio, a gesture, and a movement. The movement of the apparatus may comprise for example orientation or rotation of the apparatus to provide an input from the user.

The data objects 111-113, 121-129 may be created by querying internal systems or external systems and fetching the relevant data objects. In addition, the user name and/or service attribution may be shown in the layout of the image data objects 111-113, 121-129. For example, the attribution may be shown directly on the data object or part of a hover/rollover effect. In an example embodiment, the first result for each keyword or picture query need not be pulled in order to avoid the same picture being repeated for a popular keyword and some random fetching may be done. The querying of pictures may be done in advance, for example when parsing new keywords for users. This provides avoiding performance issues of trying to do this in real time.

When the user arrives at the main page of the service system and is not yet logged in, the slots 111-113 in the discovery area 110 may be empty by default. When the user arrives at the main page as logged in, the slots 111-113 in the discovery area 110 will be filled with data objects based on the user's previous session. This may be possible because anytime the user utilizes "discover" function 114 or "share" function 115, the system creates a unique uniform resource locator (URL) that is stored. Any action the user takes to fill the discovery area 110 that are not saved by utilizing "discover" button 114 or "share" button 115 may be lost. When the user enters the system via a shared system link from another user, for example via Facebook™, Tumblr™ or Twitter™, the slots 111-113 may be occupied by those shared data objects. This may be possible because anytime the user uses "discover" 114 or "share" 115, the system creates a unique uniform resource locator (URL) that is stored. When the same user arrives at the main page of the system the uniform resource locator (URL) may be attributed to the user that shared the uniform resource locator (URL). This may be the same uniform resource locator (URL) regardless if the arriving user owned an account to the system or not or if the user is logged in to the system or not. The difference between "logged in" and "not logged in" users in this scenario is that "logged in" users may immediately get personally relevant results in the matrix area 120. The "not logged in" users will only get results for the matrix area 120 based on relevance to what is selected in the discovery area 110 or other inputs from internal and/or external system that may be used to generate user profile information, even on a temporary basis. The latter may be a typical user arrival path to the service as new users may learn about the service and visit the service due to other users sharing the system uniform resource locators (URLs).

In an example embodiment of the present disclosure, the discover area 110 is filled by the user selecting data objects in the matrix area 120. The first selected data object is placed to the far left slot 111 and the other slots are filled accordingly from left to right to other slots 112, 113, for example. When all the slots 111, 112, 113 are occupied by a seed or a data object, clicking another seed or data object in the matrix area 120 takes the selected seed or data object in the far right slot 113. At the same time, the far left seed or data object 111 is hidden or deleted. Accordingly, the user may continue creating a string of data objects. It may be possible to add additional slots in discover area 110 to the extent that there is no limit to the amount of potential slots. It also may be possible that discover area 110 need not be a specifically dedicated area, but rather data objects can be selected and further actions may be taken with them where they initially appear in matrix area 120. It also may be possible for the system to recall data objects and allow users to take further action on them even if they are not presently visible in the discover area 110.

In an example embodiment of the present disclosure, for data objects 111, 112, 113 in the discovery area 110, an icon 119 expressing further action, such as discovering related data objects and or progressing, to an internal or external link may appear in the top right corner of the data object to indicate that they the user can connect to an internal or external site by clicking anywhere on the data object 113. When the user clicks a data object 111, 112, 113 in the discover area 110, the underlying keywords (for a text, a picture or other content types) may be inserted into an external index. Such index may be Youtube™, Google™, Twitter™, Flickr™, Wikipedia™, Tumblr™ or Blogger™, for example. A new browser window may be launched that takes the user to the said site. There may also be another internal page or popup that allows users to preview or otherwise control their next step. This selection may be random or based on some predetermined selection criteria. User's clicking on data objects 121 to 129 in the matrix area 120 may move the data objects from the matrix area 120 to the discovery area 110. The opening of an internal or external link or other related data object may be activated when the user clicks the data object 111, 112, 113 within the discovery area 110.

In an example embodiment of the present disclosure, the user may delete a selected data object by clicking a delete button 116, 117, 118. The user may also be able to delete all data objects. Such button automatically appears on each data object within the discovery area 110. As can be seen in FIG. 1, deleting an individual data object is not possible in the matrix area 120 and therefore no delete buttons 116, 117, 118 are visible. However, certain situations, controls and settings may allow the deletion of individual data objects in the matrix area 120.

In an example embodiment of the present disclosure, the discover button 114 is inactive until the user has selected at least one data object 121 to 129 from the matrix area 120. The inactivity of the discover button 114 may be represented by various possibilities, for example not showing the discover button 114 or showing the discover button 114 with a different colour or other visual indicators. The user may click the discover button 114 when at least one data object to the discovery area 110 is selected. When the user clicks data objects 111, 112, 113 in the discovery area 110, all the visible data objects 111, 112, 113 may be aggregated into their underlying keywords and are inserted into an external index. When the user clicks the discover button 114, a uniform resource locator (URL) is created and the object(s) is automatically saved to user's page that may be called the profile page. The content of this profile page is only visible to the "logged in" user and not to any other user of the service, depending on user preferences and system settings. Other users of the service may only see shared items in other users' profile pages. The discovered content may not be inserted into the users feed/stream so that any user or external system can export the data related to the user, subject to relevant terms and conditions. Only shared items may be inserted into the users feed/stream, depending on user preferences and system settings. Anything that is shared is public and accessible to any user or external system, whether they have an account to the system or not, while anything that is discovered is private and accessible only to the user who did the discovering. There may be no other privacy controls in the system, such as adding friends, for example. Either the user makes the data object public by sharing, or the data object remains private and only visible to the user. All of the above features and settings are subject to user preferences and system settings.

In an example embodiment of the present disclosure, clicking the share button 115 opens a popup window, or similar, where the user is able to select the external environment for sharing the data object. Such environment may be Facebook™, Tumblr™, Twitter™ or just the uniform resource locator (URL). External services may allow the user to sign in to the given site after which the user is taken to that site to finish the sharing process. Authentication is similar to how the user would be signing up with the third party service or importing a feed from the third party service. Once authenticated, the user may be taken to the selected site and the information may be given. Additionally, authentication may happen automatically depending on availability from external services and user preferences and system settings.

The user may also manually copy and paste the unique uniform resource locator (URL) to any other place in the internet. When the user shares a data object, the shared content/link may be automatically saved to their system profile page and marked as "shared" or similar. This means that the content/link is also visible to anyone in the system profile page.

In an example embodiment of the present disclosure, the matrix area 120 shows nine data objects 121 to 129. The system may also show more or less data objects depending on user preferences and system settings. By clicking the data object 121 to 129 in the matrix area 120, the user selects or moves the data object into the discovery area 110. Every time the user activates or collects a data object 121 to 129, the entire matrix area 120 may be refreshed. To enable fast refreshing of the data objects 121 to 129, caching next layer of data objects may be implemented. If there is any latency in the system when refreshing the new data objects 121 to 129, an animation may be used to let the user know that something is happening. For example, an icon and/or animation may be positioned in the centre of the middle slot 125 in the matrix area 120.

Every user action may be part of the feedback loop and be fed into the user profile and system algorithms. Every clicked data object 121 to 129 moving from the matrix area 120 to the discovery area 110 may influence the new data objects 121 to 129 that are being refreshed in the matrix area. The clicked data object(s) 121 to 129, in addition to other profile filter information, may become the basis for the next matrix of nine to be created based on the collected data objects. The feedback loop described above provides considerable advantage, for example the user may feel and understand that the next results are being influenced by the previous actions.

In an example embodiment of the present disclosure, refresh button 130 refreshes all the data objects in the matrix area 120. Refreshing may not affect anything in the discovery area 110. If there is any latency in the system when refreshing the new data objects 121 to 129, an animation may be required to let the user know that something is happening. For example, an icon animation may be positioned in the centre of the middle slot 125 in the matrix area 120. Feed button 140 takes the user to the feed settings page. Users may not be needed to connect/import any feeds in order to use the system. The reason users would connect/import feeds is because they may want more relevant data objects in the matrix area 120 and therefore they press a feed button 140.

In an example embodiment of the present disclosure, the feed button 140 may be replaced by a personalize button 140 taking the user to personalize area. In the personalize area, the user may help improving the profile by providing data, selecting, authenticating or importing external data sources (e.g. feeds or other accessible data) via internal and/or external systems, or some combination of these. Users may not need to personalize in this method in order to use the system. The reason users would use personalize button 140 and the personalize area is because it helps providing richer profile information and therefore more relevant content and data objects.

In an example embodiment of the present disclosure, in addition to the key areas 110, 120, the display view 100 may also contain top navigation pane 150 and bottom navigation pane 160. The top navigation pane 150 includes several buttons when "not logged in" to the system. Sign up button (not shown in FIG. 1) takes the user to the sign up page, log in button (not shown) takes the user to the log in page and home button 151 takes user to the homepage. If the user is already on the homepage, clicking the home button 151 refreshes the entire view 100, but only the matrix area 120 changes, depending on user preferences and system settings. If the user is already "logged in" to the system, the top navigation pane 150 includes partially different buttons. Log out button 152 logs user out and takes her to homepage as not logged in. Settings button 153 takes the user to the settings page. FutureStream button 154 takes the user to the profile page. Home button 151 takes user to the homepage. If the user is already on the homepage, clicking the home button 151 refreshes the entire view 100, but only the matrix area 120 changes, depending on user preferences and system settings. Username 155 is plain text showing the username "logged in".

The bottom navigation pane 160 includes several buttons. About button 161 takes user to the about page. FutureStream button 162 takes user to system's profile page that is not a unique page but the same as any other user's profile page. Blog button 163 takes the user to the blog page that may be an external blog service integrated to the system. Follow button 164 takes the user to the follow page. Contact button 165 takes the user to the contact page. Privacy & Terms button 166 takes the user to the privacy and terms page and feedback button 167 takes the user to the feedback page.

In an example embodiment of the present disclosure, only one data object area 110, 120 is included. In such data object area 110, 120 at least one predictive data object 111-113, 121-129 may be provided. User may select the at least one predictive data object and the service system provides an additional data object based on the selection. User's profile information may be used for predictive data object generation. Furthermore, information on user's selection is stored to the service system and the information may be used to update user's profile information, for example the filters included in the profile information.

Figure 2:
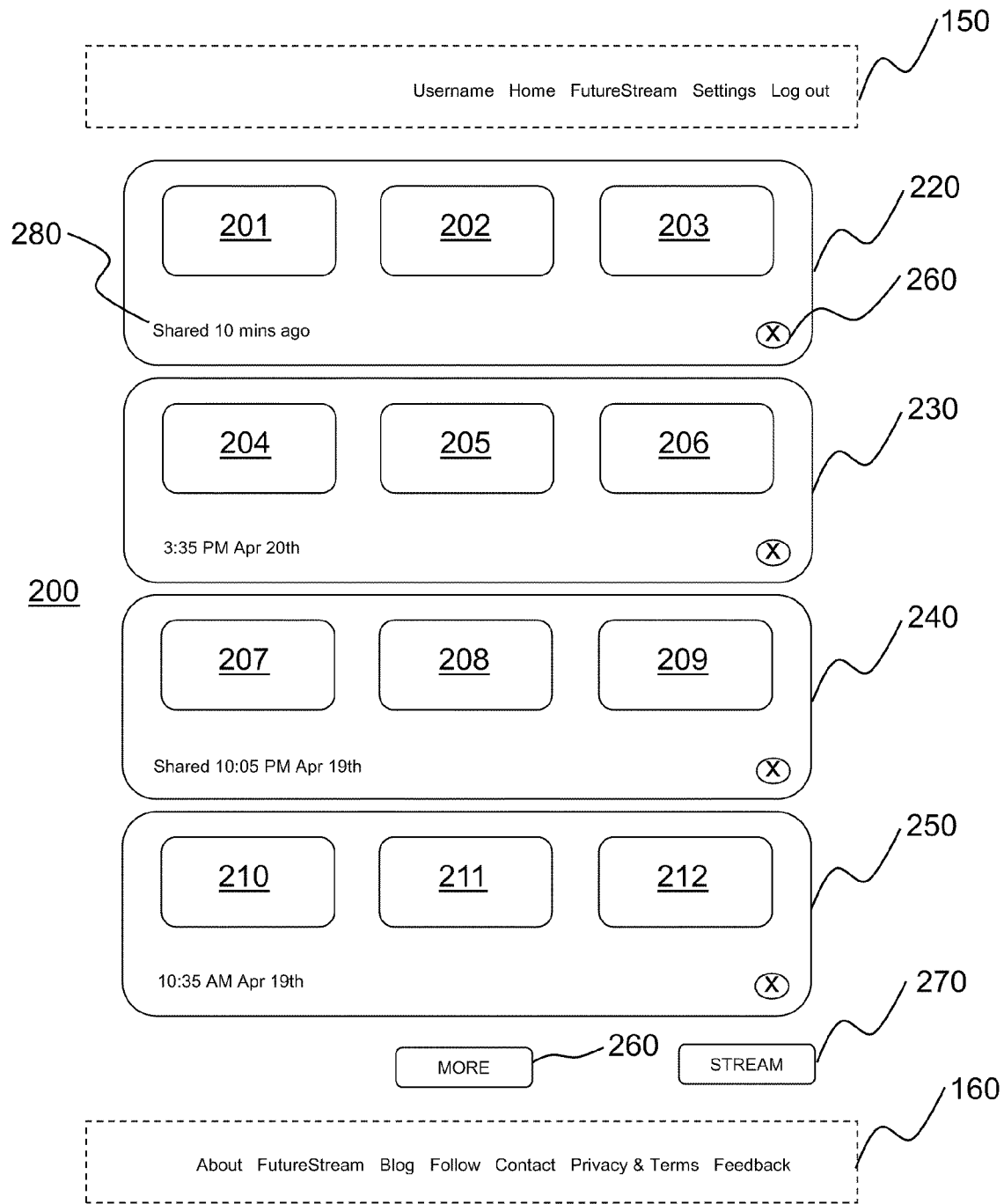
FIG. 2 shows a schematic picture of a display view for a profile page viewed by using the method providing predictive data objects according to an example embodiment of the present disclosure.

FIG. 2 shows a schematic picture of a display view for a profile page 200 viewed by using the method providing predictive data objects according to an example embodiment of the present disclosure. Profile page 200 is the same page as a profile page discussed above for FIG. 1.

In an example embodiment of the present disclosure, every "logged in" user owns a personal profile page 200. Such profile page 200 consists of a list of past discovered and/or shared and/or stored object groups 220 to 250. Each object group 220 to 250 may contain between 1 and 3 data objects 201 to 212 each. It may be possible to add additional slots to the extent that there is no limit to the amount of potential slots. In FIG. 2, four object groups 220 to 250 are shown as the default view. Object group 220, 240 that have been shared show "Shared", or similar, next to the timestamp. Object group that have been discovered show no extra text. The background color, or other visual appearance, for these two types of object groups may be different to improve up the usability. Timestamp 280 may be included in each object group providing the time of the discovery and/or sharing and/or storing.

User may delete an individual object group 220 to 250 by using delete button 260. User may not interact with anything within the object group 220 to 250, such as clicking individual data objects 201 to 212 or deleting individual data objects 201 to 212. The only actions the user may perform within the object groups 220 to 250 are to delete or click the entire object group 220 to 250.

In an example embodiment of the present disclosure, when the user clicks an object group 220 to 250, the user is taken back to the home page 100 and the object group 220 to 250 clicked will be placed in the discovery area 110. The user has full operability over all home page functions as described earlier for FIG. 1. The object group 220 to 250 may act as a starting point for the user to begin creating new data objects.

Four more object groups 220 to 250 may be shown by using a more button 260. The user may continue to click the more button 260 again to get more object groups. A stream button 270 is a tool for any user, either "logged in", "not logged in" or any internet user or external service, to export a really simple syndication (RSS), or other relevant format, feed of that particular profile page 200. Shared object groups 220, 240 may be contained within the feed. For clarification, no user may have the ability to export discovered object groups 230, 250 since those are private, depending on user preferences and system settings. The user needs to first share the object group 220, 240 before being able to feed publicly, depending on user preferences and system settings.

In an example embodiment of the present disclosure, the display view of the profile page 200 may also contain top navigation pane 150 and bottom navigation pane 160 as described above for FIG. 1.

Figure 3:
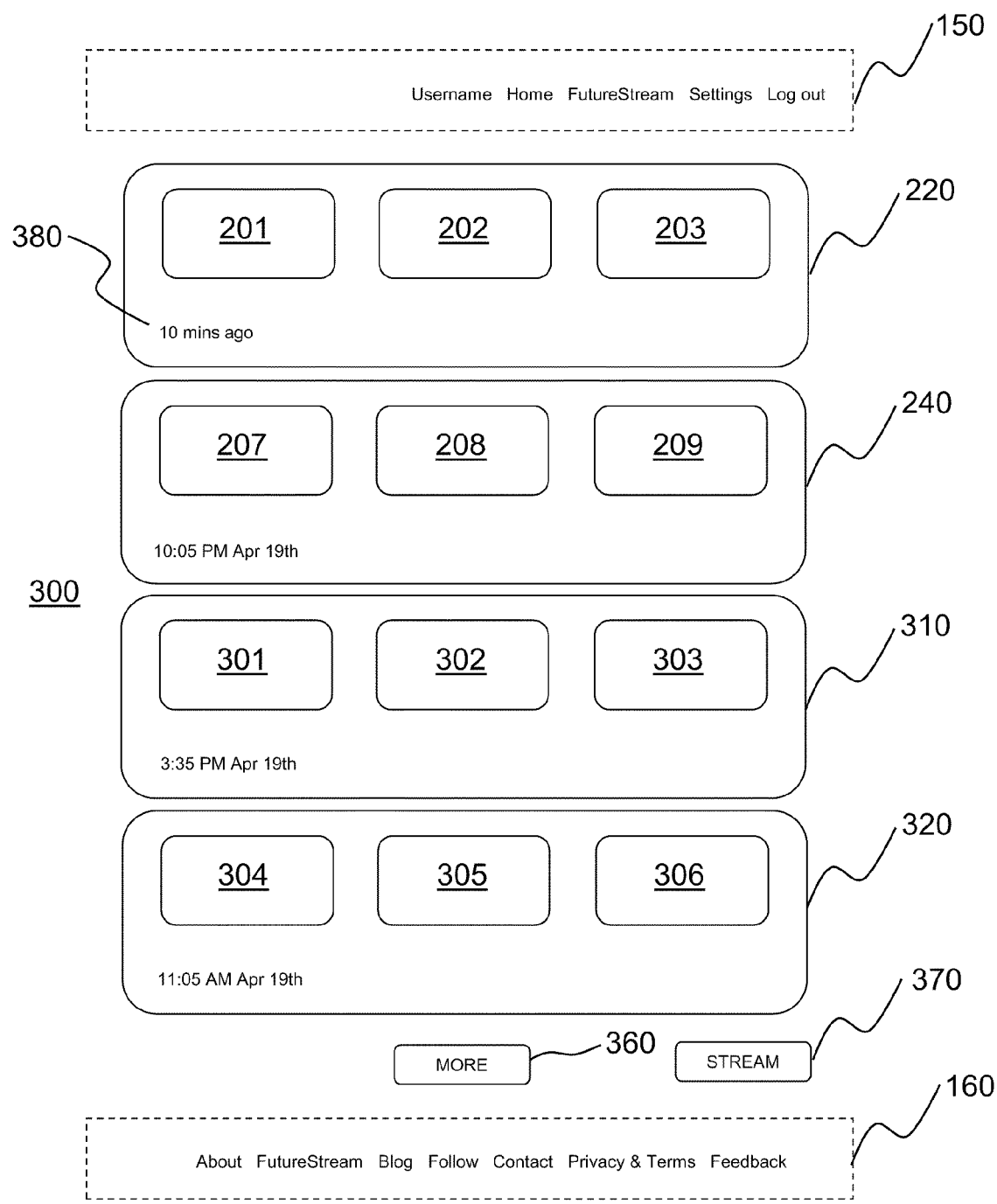
FIG. 3 shows a schematic picture of a display view for other user's profile page viewed by using the method providing predictive data objects according to an example embodiment of the present disclosure.

FIG. 3 shows a schematic picture of a display view for other user's profile page 300 viewed by using the method providing predictive data objects according to an example embodiment of the present disclosure. The profile pages 300 of other users are fully public to anyone, depending on user preferences and system settings. These profile pages 300 only show object groups 220, 240 that a particular user has shared, depending on user preferences and system settings. These object groups 220, 240 include in the example of FIG. 3 six data objects 201, 202, 203, 207, 208, 209. Discovered data objects 204, 205, 206, 210, 211, 212 are not included due to belonging to the discovered object groups 230, 250 in FIG. 2, depending on user preferences and system settings. In addition to the shared object groups 220, 240, on the other user's profile page is visible other earlier shared object groups 310, 320 including earlier shared data objects 301 to 306. Each object group 220, 240, 310, 320 may contain a number of data objects 201 to 203, 207 to 209, 310 to 306 each. For example, between one and three data objects are included in each four object groups as shown in FIG. 3. It may be possible to add additional slots to the extent that there is no limit to the amount of potential slots. Timestamp 380 may be included in each object group providing the time of the sharing, discovering or storing.

Four or more object groups 220, 240, 310, 320 may be shown by using a more button 360. The user may continue to click the more button 360 again to get more object groups. A stream button 370 is a tool for any user, either "logged in", "not logged in" or any internet user or external service, to export a really simple syndication (RSS) feed, or other relevant format, of that particular other user's profile page 300. Shared object groups 220, 240, 310, 320 may be contained within the feed.

In an example embodiment of the present disclosure, the display view of the other user's profile page 300 may also contain top navigation pane 150 and bottom navigation pane 160 as described above for FIG. 1.

User viewing the other user's profile page 300 may not interact with anything within the object group 220, 240, 310, 320, such as clicking or deleting individual data objects 201 to 203, 207 to 209, 310 to 306. The only action user may perform is to click an entire object group 220, 240, 310, 320.

In an example embodiment of the present disclosure, when the user clicks an object group 220, 240, 310, 320 the user is taken back to the home page 100 and the object 220, 240, 310, 320 they clicked may be placer in the discovery area 110. The user has full operability over all home page functions as described earlier for FIG. 1. The object group 220, 240, 310, 320 may act as a starting point for the user to begin creating new data objects to be discovered, shared or stored.

In an example embodiment of the present disclosure, the user may login to the system in alternative ways. First alternative may be direct login to the system. User fills the login fields according the instructions. Both username and password fields are required. Second alternative may be Facebook™ connect integration access and third one may be Twitter™ connect integration access, for example. After successful login, the user is taken to the system home page 100. The discovery area 110 is filled with data objects according to the user's previous session in addition to other profile filter information, with corresponding uniform resource locator (URL). Anytime a user discovers, shares or stores something, the system creates a unique uniform resource locator (URL) that is stored. Any actions the user took to fill the discovery area 110 that were not saved by taking action of discover or share may be lost. In similar manner the user may also sign up to the system using alternative ways described above.

Figure 4:
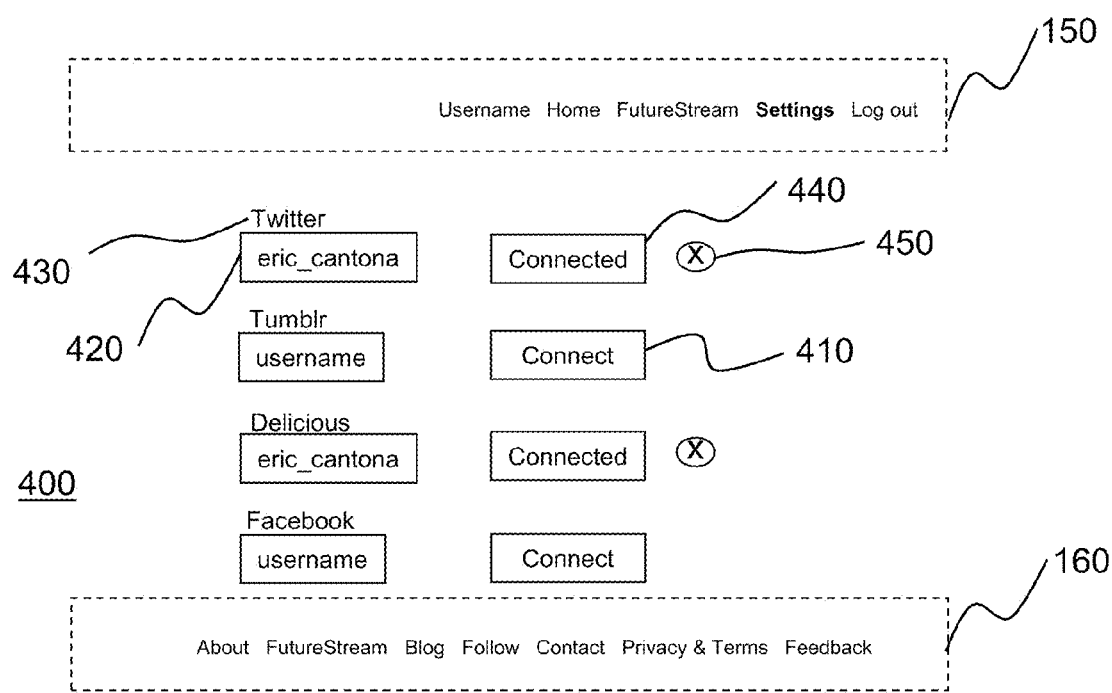
FIG. 4 shows a schematic picture of a display view for the feed settings page viewed by using a method providing predictive data objects according to an example embodiment of the present disclosure.

FIG. 4 shows a schematic picture of a display view for the feed settings page 400 viewed by using a method providing predictive data objects according to an example embodiment of the present disclosure. In feed settings page 400 the user may connect the system to other services 430 to import data to the system from the given services 430, for example Twitter™, Tumblr™, Delicious™, Flickr™, Facebook™, Tumblr™, Twitter Private™ and LinkedIn™. User may give the username 420 to a given service 430 and click the connect button 410 to connect the system with a selected data feed. The connect button 410 opens up a connect popup window, or similar, for the service 430. An animation, for example a rotating refresh icon, indicates that the system is establishing a connection. Users may not always have a possibility to connect to external services directly from this display view. In such cases, the user may follow the connection process associated with that particular service, for example the user is forwarded directly to an external site or a popup box may appear. A connected button 440 may appear when the connection is established. A disconnect button 450 may appear next to the connected button 440 after the connection to a given feed 430 is established. When pressing the disconnect button 450, the connection is terminated and the connected button 440 reverts to connect button 410. Additionally, this process may happen automatically depending on availability from external services, user preferences, and system settings.

In an example embodiment of the present disclosure, the display view for the feed settings page 400 may also contain top navigation pane 150 and bottom navigation pane 160 as described above for FIG. 1.

Figure 5:
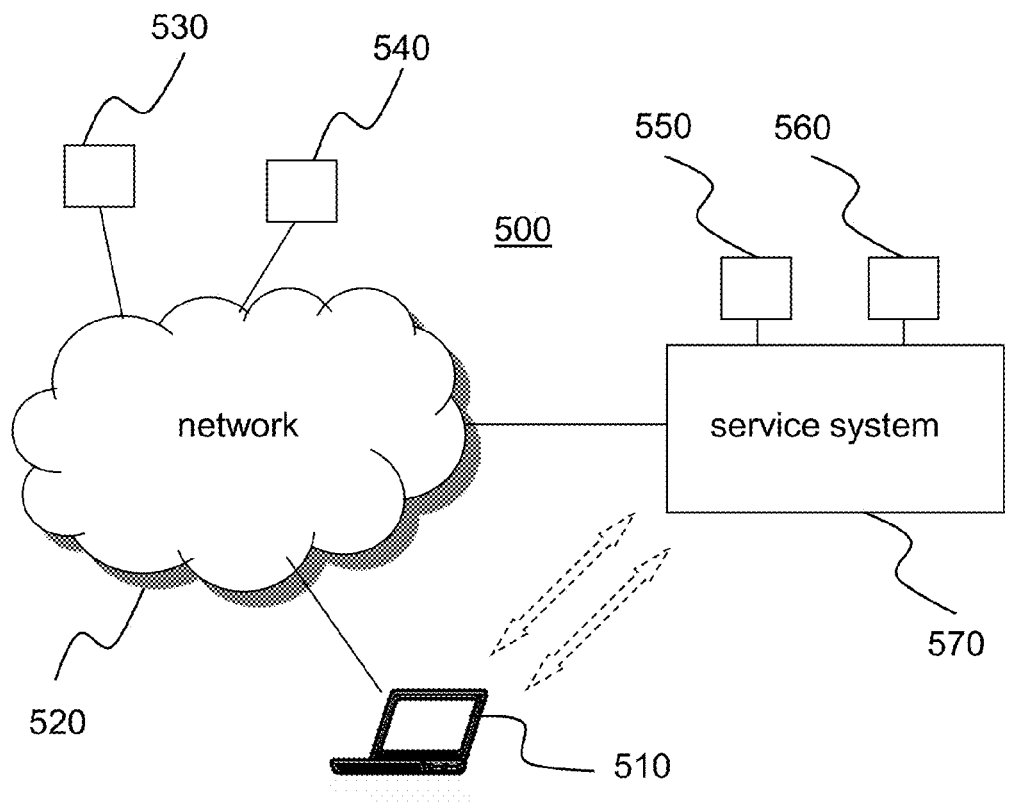
FIG. 5 shows a schematic picture of a communication system having data flows between elements in a system according to an example embodiment of the present disclosure.

FIG. 5 shows a schematic picture of a communication system having data flows between elements in a system according to an example embodiment of the present disclosure. Communication system 500 provides predictive data flows between elements in the system 500. The system 500 includes an apparatus 510, shown as a portable computer for communicating with a user, but could take any appropriate form, such as a cellular telephone handset, personal digital assistant, a personal computer, or a voice-driven communication device. Apparatus 510 may obtain the information the user needs through network 520 that may be a single network or combination of networks. Apparatus 510 may also generate information. A service system 570 may also communicate with the network 520 to receive predictive data object requests from apparatus 510 and locate information to return to the apparatus 510. The service system 570 may be of any applicable form. Among other components included in the service system 570 there may be an index database 550 and a cached information database 560. The index database 550 contains data that represent searchable information available to the search system 570. For example, the search system 570 may scan the internet, intranets or various databases for content such as web sites, service providers, external indexes or workgroup discussions, may extract key words and other objects from the content, and may organize the information in a manner that permits ready searching and retrieval. The index database 550 may also generate other information from the content, such as indicators of how certain web sites link to other web sites, and other related metadata.

In an example embodiment of the present disclosure, the cached information database 560 contains copies or substantial copies of content that the service system 570 locates. For example, the cached information database 560 may contain web pages or portions of web pages, for example only textual, only non-video content, only images or only specific metadata. In this manner, a user who accesses system 570 may request the cached information rather than making direct connection with the content provider, such as when the content provider is inaccessible, has changed the content since it was cached, or when the connection to the content provided is substantially slower than that to the service system 570. Service system 570 may also be used to provide partial or subsets of information or combinations of information that may be preferable, in some cases, to full web content directly from source systems.

The communication system 500 may also include other nodes 530, 540 connected to the network 520. These nodes 530, 540 could include any sort of device or devices capable of communicating with or over the network 520. For example, node 530 could be a web server that is capable of delivering content in response to requests by users, such as a user of device 510, or deliver content automatically based on a variety of attributes and variables. As another example, node 540 could be an external service provider such as Facebook™, Twitter™ or such that may be accessed by device 510 or service system 570.

Dashed arrows in FIG. 5 show an exemplary flow of information relating to the provision of a response to a request from apparatus 510, along with the provision of predictive contextual data object information to apparatus 510. Requests can be initiated by either apparatus 510 or by service system 570. Although the request passes through network 520 (and other components that are not pictured), it is directed at service system 570. Service system 570 then receives the request and applies it to a search process, such as by parsing the request, locating content in index database 550 that contains terms from the request, and ranking the matches by some predetermined method after receiving index information back from the index database 550. The service system 570 may then organize this information and transmit it back to the device 510 through network 520 as a service result. For example, the returned information may also be transcoded to appropriate format for processing in the apparatus 510, such as HTML code, XML messages, WAP code, Java applets, javascript object notations (JSONs), xhtml, plain text, voiceXML, VoxML, VXML or such.

Figure 6:
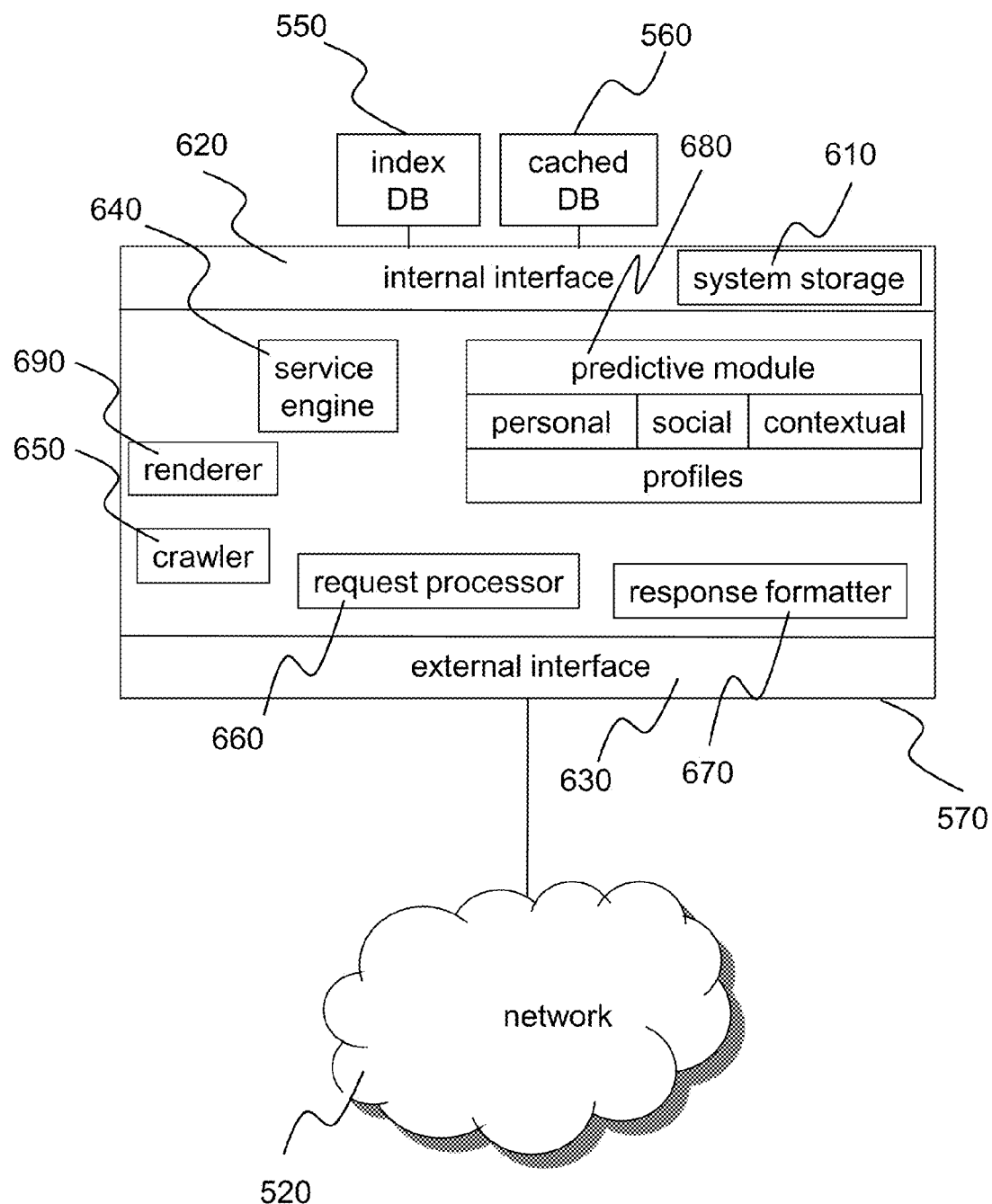
FIG. 6 shows a schematic diagram of a service system providing predictive data objects according to an example embodiment of the present disclosure.

FIG. 6 shows a schematic diagram of a service system 570 providing predictive data objects according to an example embodiment of the present disclosure. Service system 570 may receive and/or requests for discovery and/or sharing, generate responses to the requests, and generate predictive data objects based on certain criteria, for example different profile information, algorithms and such. Service system 570 is connected to a network 520, such as the internet, to be able to communicate with users who may be interested in accessing the services provided by service system 570. Service system 570 may be broken into multiple separate systems to allow for scalability, and may be connected to network 520 in any of a variety of ways, as is commonly known.

Service system 570 may also include an index database 550 and a cached information database 560. These databases may be connected to service system 570, for example, by a high bandwidth LAN or WAN, or could also be connected to the search system 570 through network 520. The databases may also be split up so that they are located in multiple locations. As described above, index database 550 generally stores information about items such as web sites, user activities, data feeds and other related information that the service system 570 reviews, rather than the web sites themselves so that the search process is faster and more efficient. The cached information database 560 generally stores copies or sub-copies of information about the items searchable by service system 570. In addition, service system 570 may include system storage 610, which may store the various components needed for the general operation of the service system 570, such as applications, system parameters, and information about registered or non-registered users of the system.

Search system 570 may communicate through an internal interface 620 and an external interface 630, which are shown as distinct interfaces, but may be partially or fully combined, or may be represented by additional interfaces. For example, internal interface 620 may comprise interface devices for a high speed, high bandwidth network such as SONET, Infiniband, or Ethernet network cards, or any appropriate communication hardware operating under an appropriate protocol, so that service system 570 can respond to a large number of distinct requests simultaneously. External interface 630 may comprise interface devices for communicating with network 520, such as ethernet network interface cards (NICs) or other communications devices. The precise design of the service system 570 could take any appropriate form.

Within the service system 570, a service engine 640 operates to produce service results in response to service requests from users, services or from predictive module 680, employing information stored in index database 550. The information in index database 550 may be gathered by a crawler 650, which may continuously or almost continuously obtain new information from sources connected to network 520. A renderer 690 may be included in the service system 570 for rendering data object related information according to system specific format. Rendering may be done also in the crawler 650, in the service engine 640 or in the external interface 630. Service requests, such as discovery or sharing from users, may be received through external interface 630 and handled by request processor 660. For example, request processor 660 may parse the requests and reformat them, for example from html/text requests to internally usable search terms/strings. The information generated by service engine 640 in response to a request may also be converted by response formatter 670 in a manner that allows it to be used by the requesting device, such as in a WAP format, HTML document, XML document or VoiceML result, and then transmitted via external interface 630.

Predictive information may be retrieved and/or generated by predictive module 680, which may monitor requests from a user, responses to the user or any number of requests and responses not exclusively related to a particular user. To clarify, these requests and responses may be generated by internal or external systems and services. In this manner, the predictive module 680 is able to begin working as soon as a request is received or a response is delivered, either from a user of the system, or from other system components or external systems. For example, where a discovery request is received by the service system 570, that request may be processed and forwarded to service engine 640. In addition, the predictive module 680 may recognize the request, and cause additional formatted requests to be forwarded to the service engine. The predictive module 680 may cause the predictive information that results from those requests to be transmitted to the user's apparatus or external services, for example, using response formatter 670.

The predictive module 680 may include, for example, predictive rules, prediction selector, algorithms, data and prediction engine. The predictive rules may include parameters that may be selected and changed to manage the manner in which predictive information is gathered. The rules may be specific to particular users (e.g., in a profile of rules for the user, or with pointers for a user to particular parameters to minimize storage space required). For example, the predictive rules for a particular user may indicate that the user prefers not to download images, prefers other particular types, categories or formats of content or sources, the user's expected bandwidth is a particular value, the user's screen size is of particular value, the user is interacting through a particular apparatus, the user is interacting through a particular service, or the user is in a particular location.

Prediction selector controls which prediction mode, of possible options, is used by system 570. For example, prediction selector may direct that other search styles are performed as part of the predictive process, or that web sites relating to hyperlinks returned as part of the initial response are gathered.

Prediction engine may apply processes to the predictive rules according to a setting indicated by the prediction selector. Prediction engine thereby causes appropriate messages or requests to be provided, for example, to the service engine 640 to retrieve additional search results in different search styles, to direct the user's apparatus to appropriate web sites so that it gathers predictive information directly, or to forward information to the user's apparatus or external services. This embodiment includes, for example, a notification service that alerts users when new or relevant information is available.

The components of predictive module 680 thus cooperate to obtain predictive information relating to, for example, requests from a user so that the user's apparatus can pre-fetch additional information the user is likely to request next. Although the predictive module 680 is shown as having three components as described above, the module 680 may take other appropriate forms, with fewer or more components, and may be integrated into system 570 in a manner other than that specifically shown. In addition, similar predictive information services could be provided by a system that is not a search system, but instead allows users to receive other types of information and/or make other types of requests.

The service system 570 may continually learn from users and it is possible to build a dedicated index, for example a content matching engine, based on the data passing through the system. Such index may be located in the index database 550. It is also possible to use any available public or proprietary index, for example but not limited to, an openly available index on the internet or a corporate database within a corporate intranet.

In an example embodiment of the present disclosure, there are different filters to be used by the predictive module 680 for selecting the data objects and other relevant information. Such filters are for example personal, social and contextual. These filters may dynamically influence the user profile, which is the core importance to the system.

Personal filters may be derived from user's own data. Such data is based, for example, on data sets or feeds that user manually connects to or imports into the system and those data sets or feeds may subsequently be automatically imported as updates become available. Another possibility for user's own data is a feedback loop of user actions taken within the system. Still another option for user's own data may be an automated connecting or crawling of external services and/or other online data based on key identity fields such as, but not limited to, names, user names, interests, other methods of identification, or other data sources contained within corporate data systems and other proprietary systems. Personal filters may also comprise data provided by the user or data from external data sources selected or authenticated by the user. Profile attributes may comprise, but is not limited to, user interests, languages, nationality, favourites, groups, networks, contacts, mobile contacts information, social graph information, location, birthplace, place of work, profession, age, sex, data objects, content or shared objects, for example.

Social filters may be derived from user's social network data. In some instances, this data is the same as, a combination of or related to the user's own data or other users' own data. Such data is based, for example, on data derived from other users, within user's imported data sets or feeds or possibly automated connecting or crawling. Another possibility for the user's social network data is the data derived by recreating the user's possible social connections, social graph, and related connections by matching user names and/or other methods of identification. Further possibility for the user's social network data is the data derived by recognizing possible users with one or many similar profile attributes and connections, for example user interests, preferences, favorites, groups, networks, shared contacts, mobile contacts information, social graph information, location, birthplace, place of work, profession, age, sex, data objects, content, shared objects, social connections, locations, nationality and languages within the service system 570. The social filters may also comprise data derived from other users that are identified to share some related profile attributes (relationships, affinities, interests, preferences or other relevant similarities), either explicitly or implicitly, with another person or user. These relationships may be defined through data provided by the user, external data sources (feeds or other accessible data) selected or authenticated or imported by the user, feedback loop of user actions within the internal and/or external systems, or automated crawling of online and/or otherwise available user data as defined by the user or the system or some combination of both.

Contextual filters may be additional filters that have information on the current state of the user and may add additional or primary layers of relevance for the user. Inputs for the contextual filters may include, but are not limited to, spatial awareness or temporal awareness. Spatial awareness may be derived from internet protocol (IP) address, mobile geolocation or inputs from various external services. Furthermore, spatial awareness may be derived from proximity or connection to certain places, things, people, other users or other location sensitive attributes. Temporal awareness is derived from, for example but not limited to, local time, currently popular trending topics or other time-sensitive attributes.

In an example embodiment of the present disclosure, the different filters may have different weighting in the algorithm generating the predictive data objects based on the profile information. Depending on the user's status and recent selections, certain dynamic filter may have stronger weighting than others. A variety of dynamic filters may also be switched on/off or adjusted in other ways depending on a variety of attributes and circumstances. Personal, social and contextual filters may act independently or may be highly inter-dependent.

In one embodiment of the present disclosure the profile information may comprise a link to the dynamic filters that may be personal for each user. Profile information may also contain several types of attributes discussed earlier in this application. Filters may contain data and algorithms and profile information. Profile information for the users may be located in system storage block 610 of FIG. 6 and filters may be located in predictive module 680, or located partially in both, and in that case, there is a link or pointer from profile to and/or from the personal filters used. Profile information may also be located in the predictive module 680. In this sense, profiles and filters may be considered as a tightly inter-connected subsystem, as could system storage 610 and predictive module 680. Filters and profiles may also connect to other users and systems, including both internal and external users and systems. Profiles and filters may be adapted and applied to external systems, partially or wholly, and external profile information and/or filter information may be adapted and applied, either partially or wholly, to internal profiles and filters.

In an example embodiment of the present disclosure, the service system described in FIGS. 5 to 6 may be applied to various purposes, for example enterprise data management, personal data management and remote personalization.

In enterprise data management, the service system may provide any personalization based on company and/or employee digital information needs, for example discovering and/or sharing relevant documents, reports, videos, pictures, materials, news, communications or people. User profile's filter information may be applied to enterprise usage. There are vast amount of information contained in corporate intranets, corporate database systems and related systems. For example in customer relationship management tools, human resources tools, project management tools, requirements management tools, communications tools, recruitment tools, marketing tools, strategic planning tools, financial tool and additionally in relevant external data sources. However, this information is often under-utilized as companies, and their employees face difficulties in providing and/or discovering and/or sharing the most relevant and beneficial data objects in a timely manner. The ability to increase the efficiency and/or enjoyment of this represents a significant opportunity to increase productivity and competitiveness in enterprises.

In personal data management, the service system may provide personalization based on personal information needs. Such personalization may be for example, discovering and/or sharing relevant documents, videos, pictures, music, materials, news, communications, people, notes or emails. User profile's filter information may be applied to personal usage. Individuals increasingly create, store, manipulate, backup and share an increasing amount of data objects across a wide variety of services and apparatuses. These data objects represent a vast potential resource for individuals. However, these are often under-utilized as individuals face difficulties in providing and/or discovering and/or sharing the most relevant and beneficial data objects in a timely manner. The ability to increase the efficiency and/or enjoyment of this represents a significant opportunity to increase personal productivity and satisfaction of individuals.

In remote personalization, the service system may provide personalization based on proximity to an external service or apparatus. For example, tourist information personalization, rental car personalization, retail information personalization, special offers personalization, restaurant ordering personalization, public entertainment personalization or public music personalization. User profile's filter information may be applied to remote personalization usage. Individuals increasingly interact remotely and/or in proximity to a variety of networked and/or local services and apparatuses through a variety of enabling technologies, for example but not limited to, internet protocol (IP) address, mobile geolocation information, radio frequency identification (RFID), proximity to known places or proximity to known users.

Figure 7:
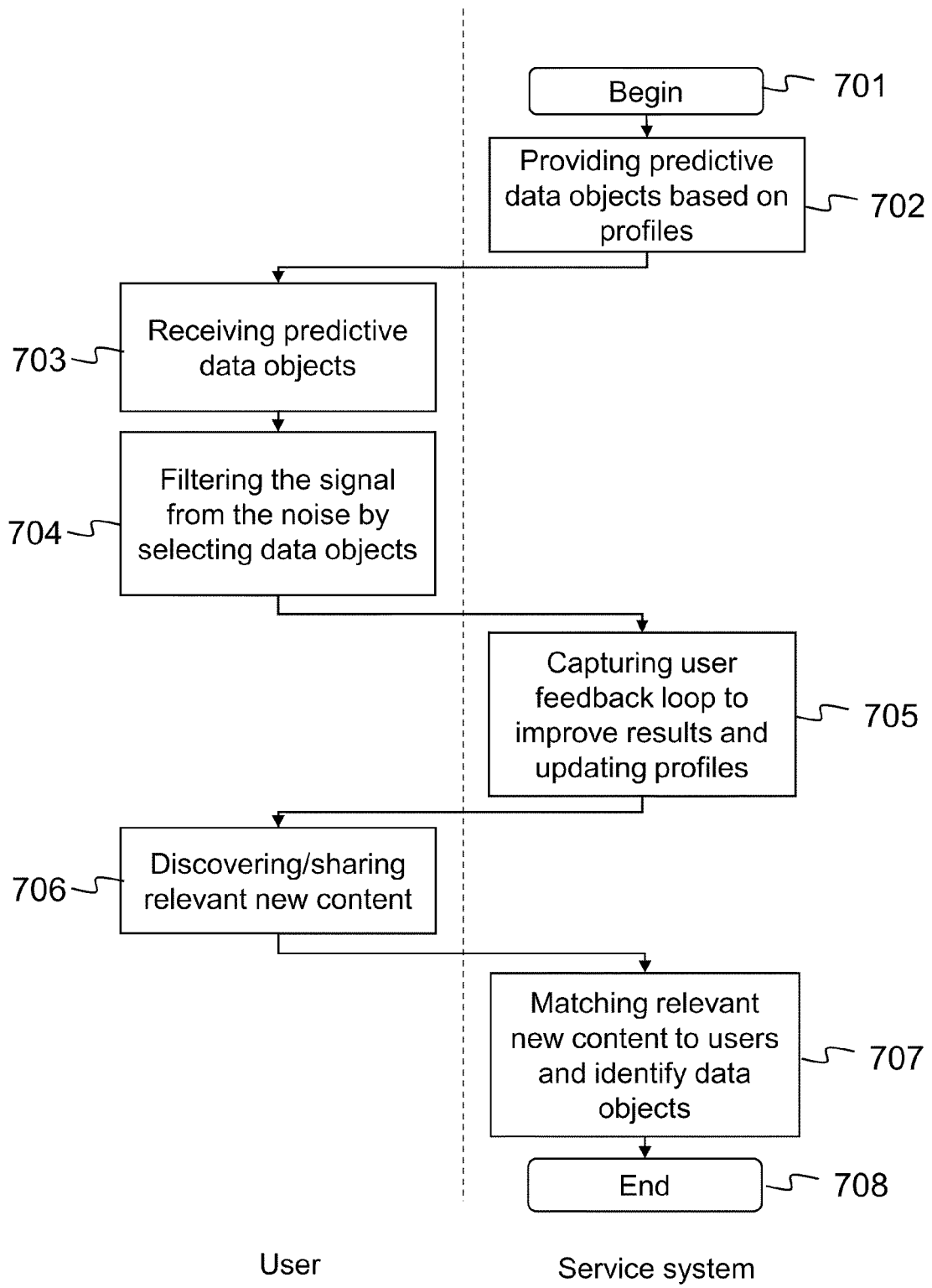
FIG. 7 shows a flow chart of exemplary steps for providing predictive data objects according to an example embodiment of the present disclosure.

FIG. 7 shows a flow chart of exemplary method steps for providing predictive data objects according to an example embodiment of the present disclosure. The method steps may be performed in parallel and the operations may occur in other order. In addition, more steps or fewer steps may be carried out. The method begins at block 701. Such beginning trigger may be user logging in to the service system, opening the home page of the system without being logged in, accessing the service through an external application or interface, new responses and requests from external systems, or being notified by the service system based on information received or generated by predictive module 680. In block 702, the service system provides relevant or predictive data objects to the user. This may be done based on some filter and profile information described earlier. Such filter information may contain for example personal, social and contextual filters. In block 703, user may receive the relevant or predictive data objects. In block 704, filtering the most relevant data objects from the noise may be carried out by user's selecting certain data objects. In block 705, the service system may capture user actions (feedback loop) to improve results and update profiles and filters with new index data, profile and filter information. In block 706, the user may perform discovering or sharing of data objects, which may additionally generate relevant new content and data objects and/or explore relevant or related information of the selected data object. Selected, discovered or shared data objects may be stored to personal profile page of the user in the service system index database 550. Selected, discovered or shared data objects may be stored to public profile page of the user that may enable other users and/or non-users to access and follow. In addition, the selected, discovered or shared data objects may be stored to the service system index database 550. Based on the selecting, discovering and/or sharing activities by users, matching relevant new content to users and identifying new data objects may be carried out in step 707. Method ends at step 708 when the user logs out from the service system or stops using the service system without being "logged in", for example.

The example method presented in the foregoing is an example only. In other embodiments, different functions in the method may occur in a mutually different order.

Figure 8:
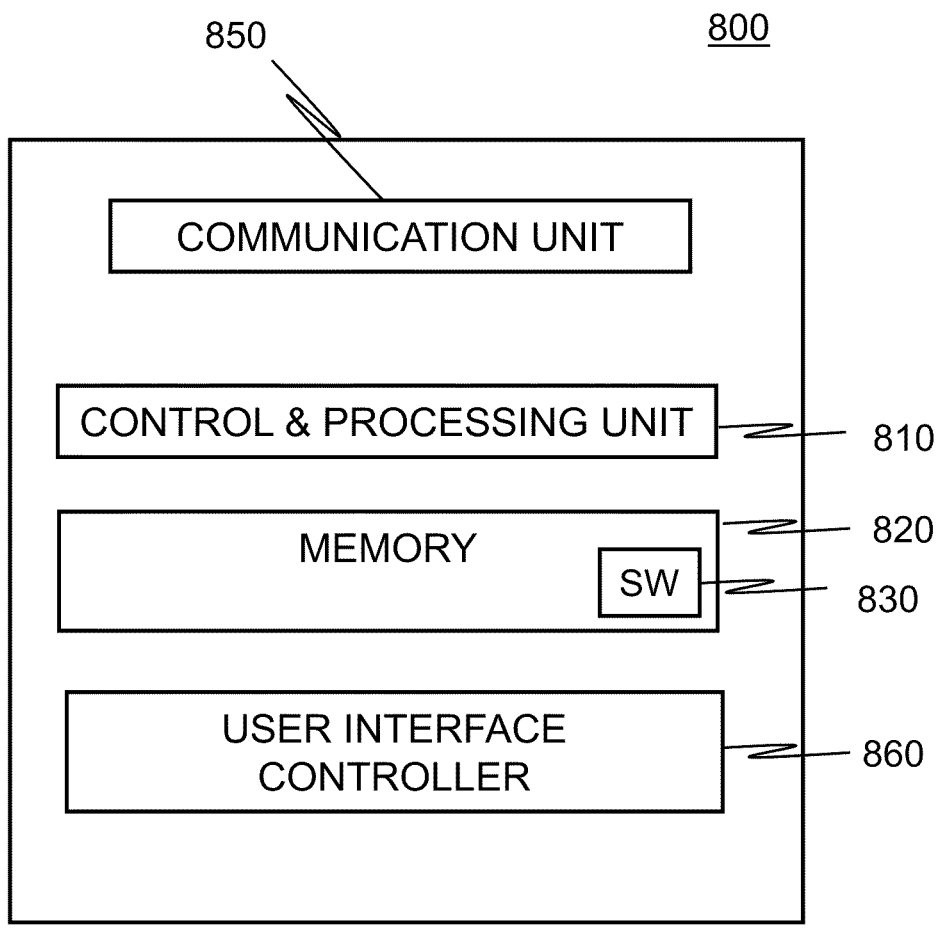
FIG. 8 shows an example block diagram of an apparatus in which various embodiments of the present disclosure may be applied.

FIG. 8 presents an example block diagram of an apparatus 800 in which various embodiments of the present disclosure may be applied. This may be a user device or apparatus, such as a mobile terminal or other communication device.

The general structure of the apparatus 800 comprises a communication interface module 850, a processor 810 coupled to the communication interface module 850, and a memory 820 coupled to the processor 810. The apparatus further comprises software 830 stored in the memory 820 and operable to be loaded into and executed in the processor 810. The software 830 may comprise one or more software modules and can be in the form of a computer program product. The apparatus 800 further comprises a user interface controller 860 coupled to the processor 810.

The communication interface module 850 implements at least part of the user data radio discussed in connection with various embodiments of the present disclosure. The communication interface module 850 may be, e.g., a radio interface module, such as a WLAN, Bluetooth, GSM/GPRS, CDMA, WCDMA, or LTE (Long Term Evolution) radio module. The communication interface module 850 may be integrated into the apparatus 800 or into an adapter, card or the like that may be inserted into a suitable slot or port of the apparatus 800. The communication interface module 850 may support one radio interface technology or a plurality of technologies. FIG. 8 shows one communication interface module 850, but the apparatus 800 may comprise a plurality of communication interface modules 850.

The processor 810 may be, e.g., a central processing unit (CPU), a microprocessor, a digital signal processor (DSP), a graphics processing unit, or the like. FIG. 8 shows one processor 810, but the apparatus 800 may comprise a plurality of processors.

The memory 820 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 800 may comprise a plurality of memories. The memory 820 may be constructed as a part of the apparatus 800 or it may be inserted into a slot, port, or the like of the apparatus 800 by a user. The memory 820 may serve the sole purpose of storing data, or it may be constructed as a part of an apparatus serving other purposes, such as processing data.

The user interface controller 860 may comprise circuitry for receiving input from a user of the apparatus 800, e.g., via a keyboard, graphical user interface shown on the display of the apparatus 800, speech recognition circuitry, or an accessory device, such as a headset, and for providing output to the user via, e.g., a graphical user interface or a loudspeaker. The user interface controller 860 may also comprise a movement detector, for example a gyroscope, for detecting the movement of the apparatus 800 for user input. The display of the apparatus 800 may comprise a touch display or a touchpad. If using the touch display or the touchpad, for example, a set of swipe gestures may be defined to be used to control the apparatus functions, such as operating the graphical user interface.

A skilled person appreciates that in addition to the elements shown in FIG. 8, the apparatus 800 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 800 may comprise a disposable or rechargeable battery (not shown) for powering the apparatus 800 when external power if external power supply is not available.

Figure 9:
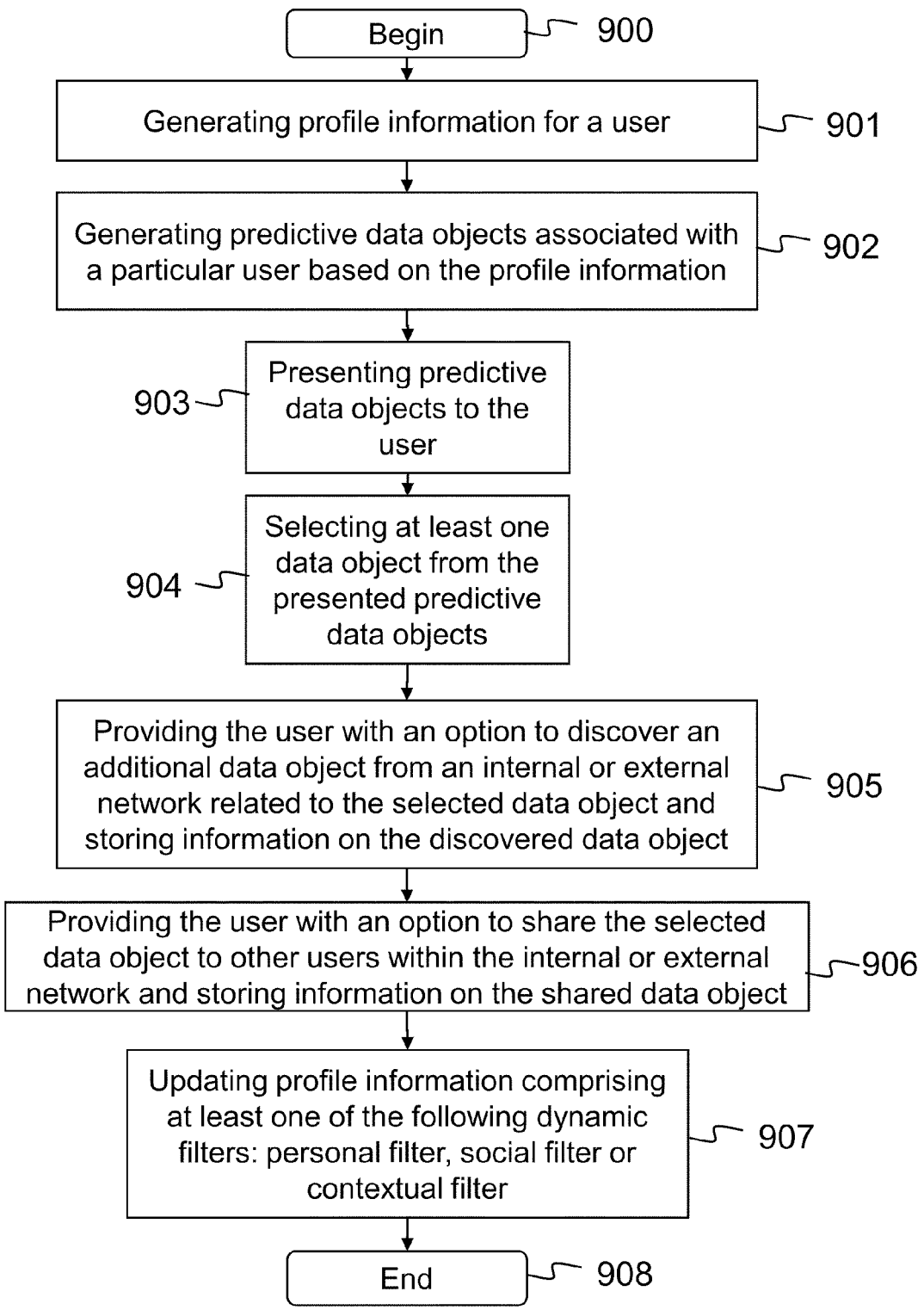
FIG. 9 shows a flow chart showing operations for providing predictive data objects according to an example embodiment of the present disclosure.

FIG. 9 shows another flow chart of exemplary method steps for providing predictive data objects according to an example embodiment of the present disclosure. The method steps may be performed in parallel and the operations may occur in other order. In addition, more steps or fewer steps may be carried out. The method begins at step 900. In step 901, profile information for a user is generated. In step 902, predictive data objects are associated with a particular user based on profile information. In step 903, predictive data objects are presented to the user. In step 904, at least one data object is selected by the user from the presented predictive data objects. For further clarification, non-selected objects can still be viewed by the user, but selection is required for further action. In step 905, the user is provided an option to discover an additional data object from an internal or external network related to the selected data objects, or explore relevant or related information of the selected data objects, and information on the discovered and/or selected data objects are stored. In step 906, the user is provided an option to share the selected data object to other users within the internal or external network and information on the shared data object is stored. Sharing may also happen automatically when users select or discover data objects, depending on user preference and system settings. In step 907, the profile information comprising at least one of the following dynamic filters: personal filter, social filter or contextual filter, is updated. In step 908, the method ends.

Figure 10:
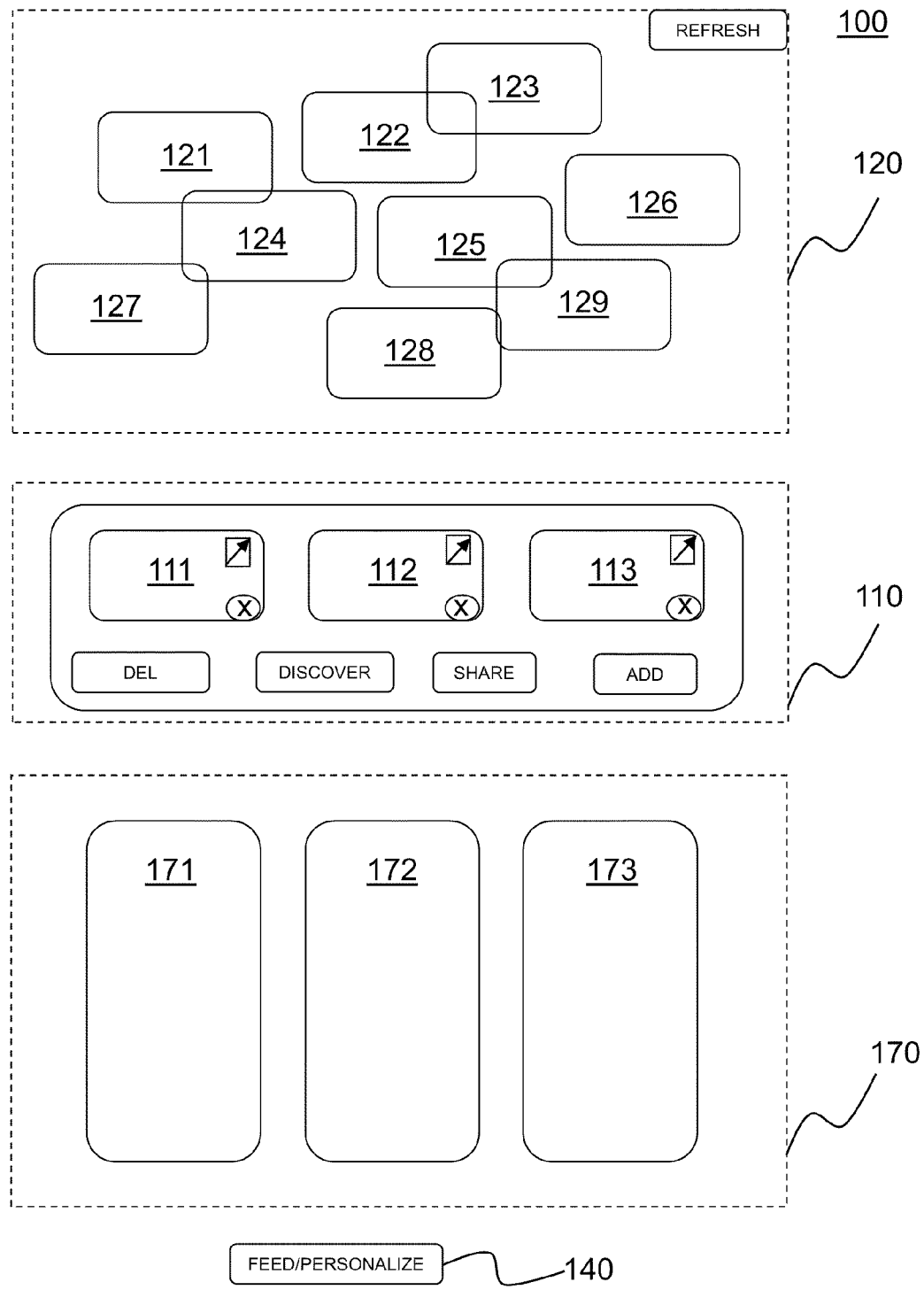
FIG. 10 shows a schematic picture of a display view for the home page viewed by using a method providing predictive data objects according to another example embodiment of the present disclosure.

FIG. 10 shows a schematic picture of a display view for the home page 100 viewed by using a method providing predictive data objects according to another example embodiment of the present disclosure. Similarly, as in FIG. 1, the home page 100 may comprise top navigation pane and bottom navigation pane that are not shown in FIG. 10. Furthermore, the functionalities described for FIG. 1 may also apply to the display view of FIG. 10.

Figure 11:
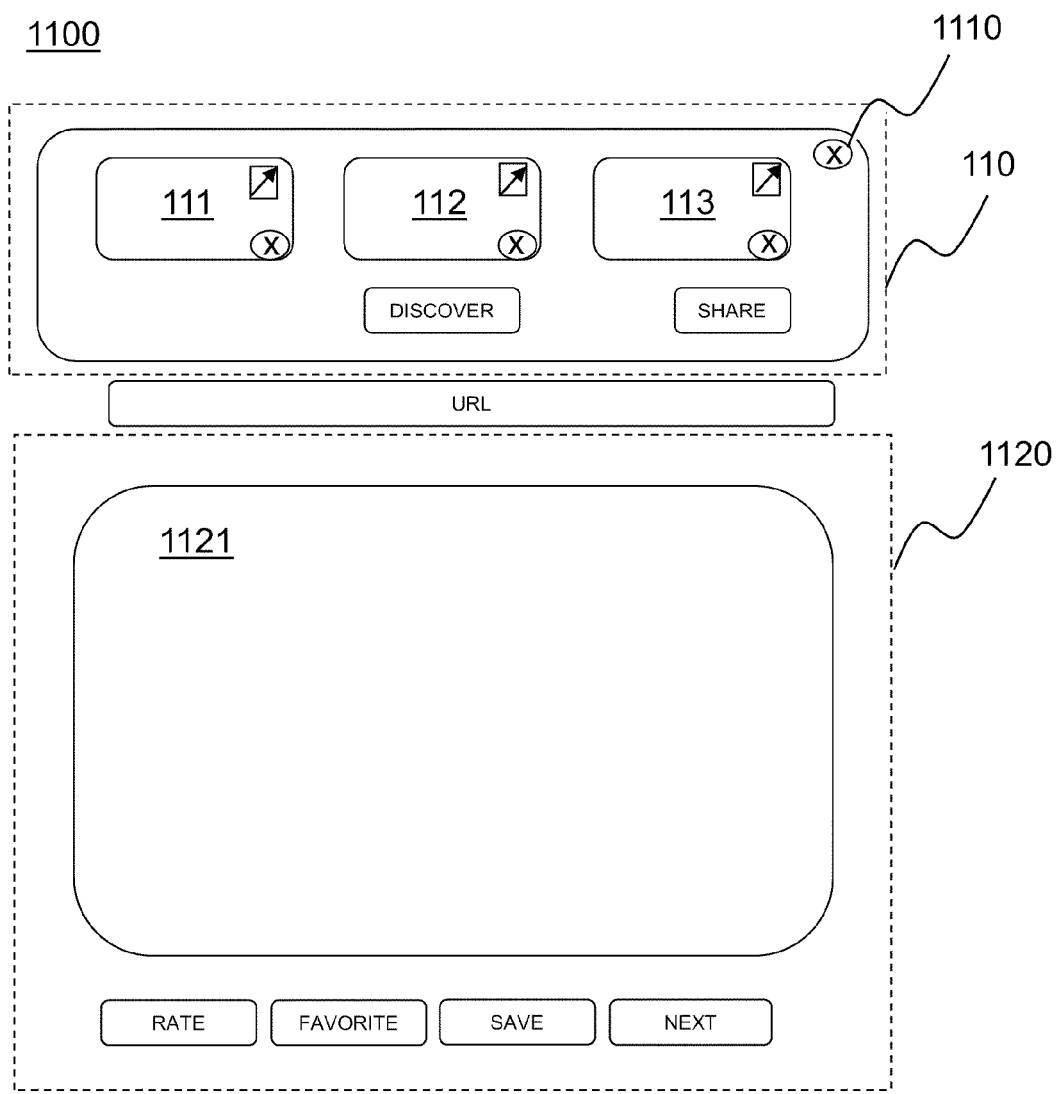
FIG. 11 shows a schematic picture of a display view for the full content page viewed by using a method providing predictive data objects according to an example embodiment of the present disclosure.

In an example embodiment of the present disclosure, the display view for the home page 100 viewed by using the method providing predictive data objects has three key areas: a discovery area 110, a matrix area 120 and a preview area 170. The discovery area 110 may contain data objects 111, 112, 113, which have either been selected or created by the user or dynamically generated by the system. The discovery area 110 may also contain a delete button DEL, an add button ADD, a discover button DISCOVER and a share button SHARE. The matrix area 120 may contain a set of future data objects 121-129 and a "refresh" button. The preview area 170 may contain content preview objects 171, 172, 173. The content preview objects 171, 172, 173 may contain content previews of the selected data objects 111, 112, 113 of the discovery area 110. The content preview objects 171, 172, 173 may be updated based on selected data objects 111, 112, 113. Furthermore, a dynamic user profile may be used for updating. A feed/personalize button 140 may be included as described in FIG. 1. The personalize button 140 may take the user to personalize area. In the personalize area, the user may help improving the profile by providing data, selecting, authenticating or importing external data sources (e.g. feeds or other accessible data) via internal and/or external systems, or some combination of these. Users may not need to personalize in this method in order to use the system. The reason users would use personalize button 140 and the personalize area is because it helps providing richer profile information and therefore more relevant content and data objects FIG. 11 shows a schematic picture of a display view for a full content page 1100 viewed by using a method providing predictive data objects according to an example embodiment of the present disclosure. Such content page 1100 may be triggered by user's selection of the data objects 111, 112, 113 or the content preview objects 171, 172, 173 of FIG. 10, for example.

The full content page 1100 may comprise a content area 1120 with at least one content item 1121. The content item 1121 may be triggered by user's selection of the data objects 111, 112, 113 or the content preview objects 171, 172, 173, as described earlier in this description. The full content page 110 may be a web browser window or a content presentation layer interface, for example. Furthermore, a toolbar area 110, corresponding to the discovery area 110 of FIG. 10 may be disclosed on the full content page 1100. The toolbar area 110 may comprise the user activated data objects 111, 112, 113, discover and share icons corresponding to the discovery area 110 of FIGS. 1 and 10. Furthermore the full content page 1100 may comprise a closing icon 1110 for closing the full content page 1100. The full content page 1100 may also comprise a rate button RATE, a favorite button FAVORITE, a save button SAVE, next content button NEXT and additional content metadata reference URL, for example. Using RATE the user may rate the content item 1121 and using FAVORITE the user may add the content item 1121 in a favorite list. Saving the content item 1121 may be done using SAVE and moving to next content item 1121 may be triggered by using NEXT. The address of the content in the Internet shown as the content item 1121 may be shown in the URL field, for example. URL may also comprise any other reference, like a title.

In an example embodiment of the invention, the full content page 1100 of FIG. 11 or any view of FIGS. 1-4 and FIG. 10 may be rendered according to a system specific format and shown in an embedded web browser or an application window. Rendering for the method providing predictive data objects according to an example embodiment of the present disclosure may be provided by the crawler 650, the renderer 690 or the service engine 640 of FIG. 6, for example.

Various embodiments have been presented. It should be appreciated that in this document, words comprise, include and contain are each used as open-ended expressions with no intended exclusivity.

The foregoing description has provided by way of non-limiting examples of particular implementations and embodiments a full and informative description of the best mode presently contemplated by the inventors for carrying out the present disclosure. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this present disclosure may be used to advantage without the corresponding use of other features. As such, the foregoing description shall be considered as merely illustrative of the principles of the present disclosure, and not in limitation thereof. Hence, the scope of the invention is only restricted by the appended patent claims.

The invention claimed is:

1. A method comprising:
generating profile information for a user, the profile information comprising at least one dynamic filter;
providing a first set of predictive data objects from an internal or an external network to the user based on the profile information;
receiving a first data object selected by the user from the first set of predictive data objects;
providing a second set of predictive data objects from the internal or the external network to the user using the first selected data object and the profile information;
receiving a second data object selected by the user from the second set of predictive data objects;
providing a third set of predictive data objects from the internal or the external network to the user using a combination of the first selected data object, the second selected data object and the profile information;
maintaining information of the first and second selected data objects by the user;
providing an option for the user to deactivate any of the first and second selected data objects, wherein the information of the first and second selected data objects is updated thereafter;
providing an updated set of predictive data objects from the internal and external network to the user using the updated information of the first and second selected data objects and the profile information;
maintaining, in the dynamic filter, information on a feedback loop of user actions taken;
providing a fourth set of predictive data objects from the internal or external network to the user using the information of the first and second selected data objects and the dynamic filter, without receiving a further data object selected by the user;

providing an option for the user to share at least one data object to other users within the internal or the external network and storing information on the shared data object; and updating the dynamic filter based on the updated information of the first and second selected data objects and the feedback loop of user actions taken.

2. The method of claim 1, further comprising:

generating predictive data objects associated with a particular user based on user input of at least one of the following: a text, a picture, a voice, a video, an audio, a gesture, and a movement.

3. The method of claim 1, further comprising:

providing an option for the user to select an alternative view of the selected data objects from the internal or the external network, and storing information on the alternative view data objects.

4. The method of claim 1, further comprising:

providing an option for the user to rate the selected data objects, and storing information on the selected data objects.

5. The method of claim 1, wherein the personal filter comprises feeds imported by the user, feedback loop of user actions or automated crawling of online and open user data.

6. The method of claim 5, wherein the crawling of online and open user data is based on user attributes, user names, or other methods of identification.

7. The method of claim 1, wherein the social filter comprises data explicitly derived from other users within a user's imported feeds or data implicitly derived by recognizing users with similar profile attributes.

8. The method of claim 7, wherein the profile attribute comprises user interests, languages information or nationality information.

9. The method of claim 1, wherein the contextual filter comprises spatial information or temporal information.

10. The method of claim 9, wherein the spatial information is derived from an internet protocol (IP) address, mobile geolocation information, proximity to known places or proximity to known users.

11. The method of claim 1, further comprising representing the data objects by an image.

12. The method of claim 1, further comprising representing the data objects in textual form.

13. The method of claim 1, wherein at least one of the data objects comprises content.

14. The method of claim 1, wherein the external network comprises at least one service index belonging to a group of social media services.

15. The method of claim 1, comprising providing a further set of predictive data objects from the internal or external network to the user based on user input of at least one of a text, a picture, a voice, a video, an audio, a gesture, and a movement.

16. The method of claim 15, wherein the movement comprises orientation or rotation of an apparatus to provide an input from the user.

17. An apparatus comprising:

a communication unit configured to receive predictive data objects associated with a particular user, based on profile information and user input, from a service system;

a user interface controller configured to present the predictive data objects for the user, and to detect the selection by the user of at least one data object from the presented data objects;

a processor;

a memory including computer program code;

the memory and the computer program code configured to, with the processor, cause the apparatus to:

provide a first set of predictive data objects from an internal or an external network to the user based on the profile information;

receive a first data object selected by the user from the first set of predictive data objects;

provide a second set of predictive data objects from the internal or the external network to the user using the first selected data object and the profile information;

receive a second data object selected by the user from the second set of predictive data objects;

provide a third set of predictive data objects from the internal or the external network to the user using the first selected data object, the second selected data object and the profile information;

provide an option for the user to deactivate any of the first and second selected data objects, wherein the information of the first and second selected data objects is updated after a deactivation;

provide an updated set of predictive data objects from the internal and external network to the user using the updated information of the first and second selected data objects and the profile information;

provide a fourth set of predictive data objects from the internal or external network to the user using information of the first and second selected data objects and dynamic filter, without receiving a further data object from being selected by the user;

provide an option for the user to share at least one of the first and second selected data objects to other users within the internal or the external network and storing information on the shared data object; and update the dynamic filter using the updated information of the first and secondselected data objects and the feedback loop of user actions taken.

18. The apparatus of claim 17, wherein the memory and the computer program code are configured to, with the processor, cause the apparatus further to:

provide an option for the user to select an alternative view of the selected data objects from the internal or the external network, and store information on the alternative view data objects.

19. The apparatus of claim 17, wherein the memory and the computer program code configured to, with the processor, cause the apparatus further to:

provide an option for the user to rate the selected data objects, and store information on the selected data objects.

20. An apparatus comprising:

a processor;

a memory including computer program code;

the memory and the computer program code configured to, with the processor, cause the apparatus to:

generate profile information for a user, the profile information comprising at least one dynamic filter;

provide a first set of predictive data objects from an internal or an external network to the user based on the profile information;

receive a first data object selected by the user from the first set of predictive data objects;

provide a second set of predictive data objects from the internal or the external network to the user using the first selected data object and the profile information;

receive a second data object selected by the user from the second set of predictive data objects;

provide a third set of predictive data objects from the internal or the external network to the user using the first data object, the second data object and the profile information;

maintain information of the first and second selected data objects by the user;

provide an option for the user to deactivate any of the first and second selected data objects, wherein the information of the selected data objects is updated after a deactivation;

provide an updated set of predictive data objects from the internal and external network to the user using the updated information of the first and second selected data objects and the profile information;

maintain, in the dynamic filter, information on a feedback loop of user actions taken;

provide a fourth set of predictive data objects from the internal or external network to the user using the information of the selected data objects and the dynamic filter without receiving a further data object from the user;

provide an option for the user to share at least one data object to other users within the internal or the external network and storing information on the shared data object; and update the dynamic filter using the updated information of the first and second selected data objects and the feedback loop of user actions taken.

21. The apparatus of claim 20, wherein the personal filter comprises feeds imported by the user, feedback loop of user actions or automated crawling of online and open user data.

22. A computer program embodied on a computer readable non-transitory medium comprising computer executable program code which, when executed by at least one processor of an apparatus, causes the apparatus to perform:

generating profile information for a user, the profile information comprising at least one dynamic filter;

providing a first set of predictive data objects from an internal or an external network to the user based on the profile information;

receiving a first data object selected by the user from the first set of predictive data objects;

providing a second set of predictive data objects from the internal or the external network to the user using the first selected data object and the profile information;

receiving a second data object selected by the user from the second set of predictive data objects;

providing a third set of predictive data objects from the internal or the external network to the user using the first selected data object, the second selected data object and the profile information;

maintaining information on the first and second selected data objects;

providing an option for the user to deactivate any of the first and second selected data objects, wherein the information of the first and second selected data objects is updated after a deactivation;

providing an updated set of predictive data objects from the internal and external network to the user using the updated information of the first and second selected data objects and the profile information;

maintaining, in the dynamic filter, information on a feedback loop of user actions taken;

providing a fourth set of predictive data objects from the internal or external network to the user using the information of the first and second selected data objects and the dynamic filter, without receiving a further data object selected by the user;

providing an option for the user to share at least one of the first and second selected data object to other users within the internal or the external network and storing information on the shared data object; and updating the dynamic filter based on the updated information of the first and second selected data objects and the feedback loop of user actions taken.

* * * * *